United States Patent [19]

Skochdopole et al.

[11] Patent Number: 4,912,177

[45] Date of Patent: Mar. 27, 1990

[54] THERMOPLASTIC POLYBLENDS OF AROMATIC POLYCARBONATES AND THERMOPLASTIC POLYURETHANES

[75] Inventors: Richard E. Skochdopole; Dane L. Wright, both of Midland, Mich.

[73] Assignee: The Dow Chemical Company, Midland, Mich.

[21] Appl. No.: 346,506

[22] Filed: May 2, 1989

[51] Int. Cl.$^4$ .................. C08F 283/04; C08L 69/00
[52] U.S. Cl. .................. 525/454; 525/66; 525/67; 525/92; 525/148
[58] Field of Search .............. 525/66, 133, 45.4, 467, 525/67, 92, 148

[56] References Cited

U.S. PATENT DOCUMENTS

| 3,431,224 | 3/1969 | Goldblum | 260/13 |
| 4,034,016 | 7/1977 | Baron et al. | 260/858 |
| 4,179,479 | 12/1979 | Carter, Jr. | 525/66 |
| 4,350,799 | 9/1982 | Schmelzer et al. | 525/453 |
| 4,743,650 | 5/1988 | Boutni | 525/92 |

*Primary Examiner*—Theodore E. Pertilla

[57] ABSTRACT

This invention relates to binary thermoplastic polyblend consisting essentially of a thermoplastic aromatic polycarbonate and a thermoplastic polyester polyol-based polyurethane (TPU). The polyblends exhibit improved hydrocarbon solvent resistance and melt flow properties over polycarbonate resins.

13 Claims, No Drawings

THERMOPLASTIC POLYBLENDS OF AROMATIC POLYCARBONATES AND THERMOPLASTIC POLYURETHANES

BACKGROUND OF THE INVENTION

This invention relates to a thermoplastic polymeric resin which is a polyblend of a thermoplastic aromatic polycarbonate polymer and a thermoplastic polyurethane polymer.

Thermoplastic polycarbonate polymers are readily molded at elevated temperatures to make a wide variety of articles. Exemplary of such articles are automotive parts, tool housings, structural components and the like. The use of polycarbonate on its own for molding purposes is limited as the polycarbonate has a number of deficiencies including sensitivity of impact toughness to the ambient temperature and more particularly thickness of the molded article, and susceptibility to degradation by solvents including water and hydrocarbons.

Correction of the deficiency of polycarbonate polymers is known by blending the polycarbonates with other polymeric additives, U.S. Pat. No. 3,431,224, and addition of other compounds and stabilizers as disclosed in U.S. Pat. Nos. 3,498,946 and 3,742,083.

Polycarbonate polymers have been modified by blending with other polymers including polyethylene, polypropylene, copolymers of ethylene and an alkyl acrylate, polyamide, polyvinyl acetate, alkyl cellulose ether and polyurethane elastomer.

In U.S. Pat. No. 4,034,012 a ternary blend of polymers consisting of a polycarbonate, a polybutylene terephthalate and a thermoplastic polyurethane (hereafter referred to as TPU) is disclosed having an improved impact strength at critical thickness. U.S. Pat. No. 4,179,479 discloses a ternary polymer blend of a TPU, a thermoplastic polycarbonate and an acrylic polymer; the latter functioning as a processing aid to confer uniformity of melt flow properties. U.S. Pat. No. 4,350,799 discloses a ternary blend containing a TPU, a polycarbonate and a polyphosphate, the blend displays reduced flammability. Ternary blends of TPU, polycarbonate and rubbers as impact modifiers are disclosed by EP 125739 and U.S. Pat. No. 4,522,979.

The preparation of binary TPU, polycarbonate blends has been little studied due to the inherent problems of compatibility between polycarbonate and TPU including, for example, large differences in melt viscosities, processing temperatures and thermodynamic solubilities. These differences are especially prominent with polyether-based TPUs.

In a recent publication, U.S. Pat. No. 4,743,650, binary blends containing polycarbonate and from 5 to about 35 parts by weight of a polyether-based TPU are claimed.

Accordingly, it would be desirable to provide a binary polycarbonate, TPU blend wherein the incompatibility difference of the two polymers has been minimized and wherein molded articles prepared therefrom that show improved resistance to hydrocarbon solvents and improved impact resistance and toughness compared to polycarbonate alone.

SUMMARY OF THE INVENTION

In one aspect, this invention is a thermoplastic polyblend which consists essentially of (a) from 65 to 95 percent by weight based on the combined weights of (a) and (b) of a thermoplastic aromatic polycarbonate polymer; and (b) from 5 to 35 percent by weight based on the combined weights of (a) and (b) of one or more thermoplastics having a Shore Hardness from 70A to 70D, and characterized in that the thermoplastic polyurethane is a polyester polyol-based thermoplastic polyurethane.

In a second aspect, this invention is a process for preparing a thermoplastic polyblend which consists essentially of melt-blending;

(a) from 65 to 95 percent by weight based on the combined weights of (a) and (b) of a thermoplastic aromatic polycarbonate polymer; and (b) from 5 to 35 percent by weight based on the combined weights of (a) and (b) of one or more thermoplastics having a Shore Hardness from 70A to 70D, and characterized in that the thermoplastic polyurethane is a polyester polyol-based thermoplastic polyurethane and in that the melt blending process is substantially free of an acrylic polymer processing aid.

In a third aspect, this invention is an article prepared by melt extrusion or molding of a polyblend characterized in that the polyblend consists essentially of (a) from 65 to 95 percent by weight based on the combined weights of (a) and (b) of a thermoplastic aromatic polycarbonate polymer; and (b) from 5 to 35 percent by weight based on the combined weights of (a) and (b) of one or more thermoplastics having a Shore Hardness from 70A to 70D, and characterized in that the thermoplastic polyurethane is a polyester polyol-based thermoplastic polyurethane.

Surprisingly, it has been found that by using a TPU which has a Shore Hardness of from 70A to 70D in combination with a thermoplastic polycarbonate polymer; a thermoplastic polyblend which has good mechanical, processing and chemical properties including solvent resistance can be prepared.

DETAILED DESCRIPTION OF THE INVENTION

The polyblend consists of a thermoplastic aromatic polycarbonate polymer in from at least 65, and up to 95, preferably up to 85 and more preferably up to 75 percent by weight of the combined weight of thermoplastic aromatic polycarbonate (a) and thermoplastic polyurethane (b) present in the polyblend.

The TPU is present in the polyblend in from at least 5, preferably at least 15, and more preferably at least 25, but not more than 35 percent by weight of the combined weights of the thermoplastic aromatic polycarbonate and thermoplastic polyurethane present.

Suitable thermoplastic aromatic polycarbonate polymers that can be used in the practice of this invention are those aromatic homopolycarbonates and aromatic copolycarbonates advantageously having a molecular weight of about 10,000 to about 200,000, preferably about 15,000 to about 100,000. In addition, the polycarbonate advantageously has a melt flow rate of at least 8 g/10 minutes, preferably at least 10 g/10 minutes, and more preferably at least 12 g/10 minutes but less than 30 g/10 minutes, preferably less than 22 g/10 minutes and more preferably less than 18 g/10 minutes at 300° C. with 1.2 kg weight as measured by the ASTM Procedure D-1238.

Polycarbonates suitable for use in this present invention are prepared from dihydroxy compounds conforming to the structure of formula I or formula II

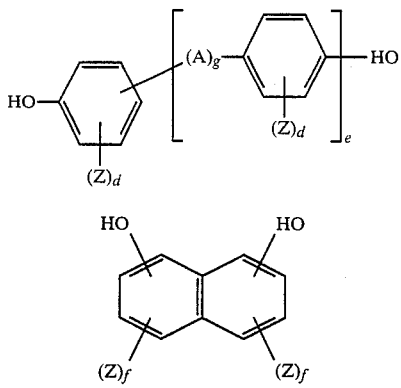

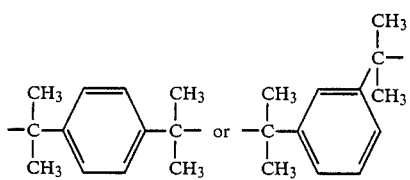

wherein A denotes an alkylene group with 1 to 8 carbon atoms, an alkylidene group with 2 to 8 atoms, a cycloalkylene group with 5 to 15 carbon atoms, a cycloalkylidene group with 5 to 15 carbon atoms, an aromatic group with 5 to 15 carbon atoms, a carbonyl group, an oxygen atom, a sulfur atom, an —SO— or —SO$_2$— radical or a radical of the general formula g denotes the number 0 or 1; e denotes the number 0 or 1; Z denotes F, Cl or Br atoms or a $C_{1-3}$ alkyl and if several Z radicals are substituents in one aryl radical, they may be identical or different; d denotes 0 or an integer of from 1 to 4; and f denotes 0 or an integer of from 1 to 3. Preferred are the dihydroxy compounds where g is 1 and e is 1.

Among the useful dihydroxy compounds in the practice of the invention are hydroquinone, resorcinol, bis-(hydroxyphenyl)alkanes, bis-(hydroxyphenyl)cycloalkanes, bis-(hydroxyphenyl)ethers, bis-(hydroxyphenyl)ketones, bis-(hydroxyphenyl)sulfoxides, bis-(hydroxyphenyl)sulfones and α,α-bis-(hydroxyphenyl)-diisopropylbenzenes. These and further suitable aromatic dihydroxy compounds are described, for example, in U.S. Pat. Nos. 2,991,273; 2,999,835; 2,999,846; 3,014,891; 3,028,365; 3,035,021; 3,035,036; 3,036,037; 3,036,038; 3,036,039; 3,148,172; 3,271,367; 3,271,368 and 3,280,078 (all incorporated herein by reference), in German Offenlegungsschriften (German Published Specifications) 1,570,703; 2,063,050; 2,063,052; 2,211,956 and 2,211,957, in French Patent Specification No. 1,561,518 and in the monograph, H. Schnell, *Chemistry and Physics of Polycarbonates,* Interscience Publishers, New York (1964). Further examples of suitable dihydroxy compounds are the bisphenols including 2,2-bis-(4-hydroxyphenyl)propane, (bisphenol A), 2,4-bis-(4-hydroxyphenyl)-2-methylbutane, 1,1-bis-(4-hydroxyphenyl)cyclohexane, α,α-bis-(4-hydroxyphenyl-p-diisopropylbenzene, 2,2-bis-(3-chloro-4-hydroxyphenyl)propane, 2,2-bis-(3,5-dichloro-4-hydroxyphenyl) propane, 2,2-bis-(3,5-dibromo-4-hydroxyphenyl) propane and 1,1-bis-(4-hydroxyphenyl)-1-phenylethane hydroxybenzophenone and 4,4-sulfonyl diphenol.

The polycarbonates of the invention may entail in their structure units derived from one or more of the suitable dihydroxy compounds.

The most preferred dihydroxy compounds when g is 1 and e is 1 are the bisphenols, especially 2,2-bis-(4-hydroxyphenyl)propane (bisphenol A).

The preparation of polycarbonate resins may be carried out in accordance with any of the processes known in the art, for example, by the interfacial polycondensation condensation process, polycondensation in a homogeneous phase or by transesterification. The suitable processes and conditions have been disclosed in the literature and in general are described in the above-mentioned monograph by H. Schnell.

In the preparation of the polycarbonate resins of the invention, monofunctional reactants such as monophenols may be used in order to limit their respective molecular weights. Also, branching obtained by the incorporation, in the respective processes, of small amounts, preferably of between about 0.05 and 2.0 molecular percent (relative to the dihydroxy compound employed) of branching agents which are at least trifunctional compounds, especially, compounds having three or more phenolic hydroxyl groups.

Polycarbonates of this type are described, for example, in German Offenlegungsschriften (German Published Specifications) 1,570,533; 1,595,762; 2,116,974 and 2,113,347, British Specification 1,079,821 and U.S. Pat. No. 3,544,514 (incorporated herein by reference).

Some examples of compounds with at least three or more phenolic hydroxyl groups which can be used are phloroglucinol, 4,6-dimethyl-2,4,6-tri-(4-hydroxyphenyl)heptane, 2,4,6-trimethyl-2,4,6-tri-(4-hydroxyphenyl)heptane, 1,4,5-tri-(4-hydroxyphenyl)benzene, 1,1,1-tri-(4-hydroxyphenyl)ethane, tri-(4-hydroxyphenyl)phenylmethane, 2,2-bis-(4,4-bis-(4-hydroxyphenyl)cyclohexyl)propane, 2,4-bis-(4-hydroxyphenylisopropyl)phenol, 3,6-bis-(2-hydroxy-5'-methylbenzyl)-4-methylphenol, 2-(4-hydroxyphenyl)-2-(2,4-dihydroxyphenyl)propane, hexa(4-(4-hydroxyphenyl-hexa(4-(4-hydroxyphenylisopropyl)phenyl)ortho-terephthalic acid ester, tetra(4-hydroxyphenyl)methane, tetra-(4-(4-hydroxyphenylisopropyl)phenoxy)methane and 1,4-bis-(4',4''-dihydroxytriphenyl)methyl)benzene. Some of the other trifunctional compounds are 2,4-dihydroxybenzoic acid, trimellitic acid, trimesic acid, cyanuric chloride and 3,3-bis-(4-hydroxyphenyl)-2-oxo-2,3-dihydroindole.

Thermoplastic polyurethanes are substantially linear polymers and have thermoplastic processing characteristics. They may be prepared from the reaction of an organic polyisocyanate, preferably a diisocyanate with a polyahl composition which comprises a polycaprolactone polyol, or a polyester polyol or a polyether polyol, and a chain extender. And hence respectively are, polycaprolactone polyol-based TPU, polyester polyol-based TPU and polyether polyol-based TPU. The thermoplastic polyurethane can be prepared by methods as disclosed in U.S. Pat. Nos. 3,214,411 and 4,376,834, the teachings of which are incorporated herein by reference. In a preferred embodiment the thermoplastic polyurethanes which can be used in this present invention are the polyester polyol-based TPUs.

The Shore Hardness of the thermoplastic polyurethane is measured according to ASTM D-2240. The thermoplastic polyurethane has a Shore Hardness of from 70A on the "A" scale, and up to 70D on the "D" scale. The TPU preferably has a Shore Hardness of from 70A to 100A, and more preferably from 85A to 100A. On the "D" scale, the TPU preferably has a hardness of from 40D to 70D and more preferably from 40D to 65D. A larger number indicates a harder TPU.

The TPU is further characterized in that it has a melt flow rate of at least 6, preferably at least 8, more preferably at least 10 and up to 40, preferably up to 35 and more preferably up to 30 g/10 min. Melt flow rates are determined according to procedure ASTM D-1238.

The polyester polyol used to prepare the TPU employed in the present invention advantageously has a molecular weight of at least 500, more preferably at least 1250, and most preferably at least 2000, but less than 20,000, preferably less than 10,000 and more preferably less than 8000. The functionality of the polyol, number of isocyanate-reactive hydrogens per molecule, is advantageously not greater than 6, and preferably, the functionality is in the range of 2 to 4.

Particularly useful polyester polyols which may be used as starting material for preparing the polyester polyol-based thermoplastic polyurethanes are those produced from divalent carboxylic acids or the anhydrides of these acids and a glycol having at least one, preferably two primary hydroxyl groups. Suitable divalent carboxylic acids include succinic acid, suberic acid, sebacic acid, oxalic acid, methyladipic acid, glutaric acid, pimelic acid, azelaic acid, phthalic acid, terephthalic acid, isophthalic acid and the like, and anhydrides of the above. Preferred polyester polyols for the present invention are those prepared from adipic acid.

By way of example, adipic acid is condensed with a suitable glycol or mixtures of glycols which have at least one primary hydroxyl group. The condensation is stopped when an acid number of from about 0.5 to about 2.0 is reached. The water formed during the reaction is simultaneously removed so that the final water content of the resulting product is from about 0.01 to about 0.02, preferably from about 0.01 to about 0.05 percent by weight.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethylpropylene glycol, 1,3-propylene glycol and the like. In addition to the glycols, a small amount of trihydric alcohol, up to about 1 percent may be used along with the glycols such as, for example, trimethylolpropane, glycerine, hexanetriol and the like. The molecular weight of the polyester polyol can be increased if desired by further reacting with an oxirane such as, for example, ethylene oxide or propylene oxide.

Any of the organic polyisocyanates and diisocyanates employed in the preparation of polyurethanes can be employed in preparing the TPUs required for the present invention. Illustrative of such isocyanates are; methylene bis(phenylisocyanates) including the 4,4'-isomer, the 2,4'-isomer and mixtures thereof, meta- and paraphenlene diisocyanates, chlorophenylene diisocyanates, α,α'-xylylene diisocyanate, 2,4- and 2,6-toluene diisocyanate and mixtures of these latter two isomers which are available commercially, toluidine diisocyanate, hexamethylene diisocyanate, 1,5-naphthalene diisocyanate, isophorone diisocyanate and methylene bis(cyclohexylisocyanate) including the 4,4'-isomer and 2,4'-isomer, and mixtures thereof.

Preferably, the organic polyisocyanate employed to prepare the TPUs useful in this invention is methylene bis(phenylisocyanate) in the form of the 4,4'-isomer as well as mixtures of the 4,4'-isomer with amounts (up to about 70 percent by weight) of the 2,4'-isomer and modified forms of these diisocyanates. By the latter are meant those forms of methylene bis(phenylisocyanate) which have been treated to render them stable liquids at ambient temperature. Such products include those which have been reacted with a minor amount (up to 0.2 equivalents per equivalent of a polyphenyl polyisocyanate) of an aliphatic glycol or mixture of alphatic glycols; such modified methylene bis(phenylisocyanates) are described in U.S. Pat. Nos. 3,394,164; 3,883,571; 4,115,429; 4,118,411 and 4,299,347; and those wherein a minor amount of the diisocyanate has been converted to the corresponding carbodiimide as described in U.S. Pat. No. 3,384,653. Mixtures of the above-described polyisocyanates can be employed if desired.

The chain extenders which are used in making the TPUs required by the present invention are aliphatic straight- and branched chain diols including cycloaliphatic diols, preferably having from 2 to 8 carbon atoms, inclusive, in the chain. Illustrative of such diols are ethylene glycol, 1,3-propanediol, 1,5-pentanediol, 1,6-hexanediol, 1,2-propanediol, 1,3-butanediol, 1,4-butanediol, 2,3-butanediol, 1,3-pentanediol, 1,2-hexanediol, 3-methylpentane-1,5-diol, 1,4-cyclohexane dimethanol, and the like including mixtures of two or more such diols. The chain extenders which can be used alone or in admixture with each other or any one of the above diols also include diethylene glycol, dipropylene glycol, tripropylene glycol, ethanolamine, n-methyl diethanolamine, n-ethyl diethanolamine and the like, as well as ester diols obtained by esterifying adipic, azelaic, glutaric and the aliphatic dicarboxylic acids with aliphatic diols such as those exemplified above utilizing from 0.01 to 0.8 mole of acid per mole of diol. Also included in the chain extenders which can be used in preparing the TPUs are adducts obtained by an aliphatic diol or triol such as 1,4-cyclohexane dimethanol, neopentyl glycol, hexane-1,2-diol, ethylene glycol, butane-1,4-diol, trimethylolpropane, and the like, with caprolactone in a mole ratio of from 0.01 to 2 moles of caprolactone per mole of diol or triol.

While any of the diol extenders described and exemplified above can be employed in preparing the thermoplastic polyurethane, alone, or in admixture, it is preferred to use 1,4-butanediol, neopentyl glycol, 1,4-cyclohexane dimethanol, ethylene glycol and diethylene glycol either alone or in admixture with each other.

The hardness of the TPU is controlled in part by the quantity and type of chain extender employed in its preparation. Larger amounts of chain extender generally give harder TPUs.

The polyol, the organic polyisocyanate and the chain extender may be individually heated preferably to a temperature of from about 60° C. to about 135° C. and then the polyol and chain extender may be substantially simultaneously mixed with the polyisocyanate. Preferably, the chain extender and the polyol, each of which has been previously heated, are first mixed and the resulting mixture is mixed with the heated polyisocyanate. This method is preferred for the reason that the extender and the polyester will not react prior to the introduction of polyisocyanate and rapid mixing with the polyisocyanate is thus facilitated.

Advantageously, the rate of reaction may be increased by adding any suitable catalyst to the reaction mixture such as tertiary amines and the like set forth in U.S. Pat. Nos. 2,620,516; 2,621,166 and 2,729,618 all incorporated herein by reference.

Other techniques for the production of thermoplastic polyurethanes useful in the context of the present invention are disclosed in the text "Polyurethanes: Chemistry and Technology", Vol. 2, pp. 299–452 by J. H. Saunders and K. C. Frisch, Interscience Publishers, New York (1964) incorporated herein by reference.

The above and other thermoplastic polyurethanes such as disclosed in U.S. Pat. Nos. 2,621,166; 2,729,618; 3,214,411; 2,778,810 and 4,376,834, Canadian Pat. Nos. 754233; 733577 and 842325 all incorporated herein by reference, which are suitable in the context of the presently described invention, may be used to prepare the thermoplastic polyblends.

The polyblends of this invention can be prepared by mixing the thermoplastic aromatic polycarbonate with the thermoplastic polyurethane and wherein the process is substantially free of a processing aid. The blending may be carried out by adding the polycarbonate and polyurethane together and mixing the components with conventional technique and apparatus. In general, the mixtures may be blended by optionally premixing in conventional mixing rolls, dough mixers, Banbury mixers and the like and blending the premix in an extruder or fluxing it on a mill at an elevated temperature sufficient to achieve a melt blending. Prior to melt-blending it is important that all ingredients are dried thoroughly, in for example, a dehumidifying dryer operating at a temperature of greater than 95° C., and are essentially water-free.

The temperature employed in the melt-blending process is sufficient to allow the preparation of the polyblend described in the present invention. Advantageously, the temperature does not exceed the decomposition temperature of the TPU that is to be blended with the polycarbonate. Typically, initial temperatures employed in a melt-blending process will be less than about 260° C., preferably less than about 250° C. and more preferably less than about 240° C. These temperatures can be maintained or reduced as appropriate so as to maintain an efficient melt-blending process whilst minimizing any possibility of decomposing the TPU.

The melt-blending process is conducted substantially free of a processing aid such as described by U.S. Pat. No. 4,179,479 and incorporated herein by reference. Such processing aids consist of an acrylic polymer having a number average molecular weight of from about 500,000 to about 1,500,000. The acrylic polymer is selected from the group consisting of homopolymers of methyl methacrylate; copolymers of methyl methacrylate with n-butyl methacrylate or ethyl acrylate; or terpolymers of methyl methacrylate, n-butyl acrylate and styrene.

By "substantially free" it is meant that the processing aid is present in less than 5.0, preferably less than 3.0, and more preferably less than 1.0 percent by weight based on the combined weight of (a) and (b), and most preferably is absent.

The thermoplastic polyblend in its melt-blended state can be used to prepare articles through extrusion techniques with or without subsequent forming or injection molding. Alternatively, the polyblend may be transformed into pellets by suitable techniques, such as disclosed by U.S. Pat. Nos. 3,642,964 and 3,963,679, and stored for future use.

The thermoplastic polyblends of the present invention may also optionally contain various commonly known and used additives such as, for example, impact modifying agents; antioxidants; antistatic agents; inert fillers such as glass, talc, mica and clay; ultraviolet radiation absorbers such as benzophenones, benzotriazoles and the like; hydrolytic stabilizers such as the epoxides disclosed in U.S. Pat. Nos. 3,489,716; 4,138,379 and 3,839,247 all of which are incorporated herein by reference; color stabilizers such as organophosphites; thermostabilizers such as phosphites; flame retardants and mold release agents.

Representative of suitable impact modifying agents are selectively hydrogenated linear, sequential or radial teleblock copolymers of a vinyl aromatic compound and an olefinic elastomer such as described in U.S. Pat. Nos. 3,281,383; 3,753,936 and 4,481,331 which are incorporated herein by reference.

The impact modifying agents, optionally, employed in preparing the polyblends of the present invention may also include rubbers or rubber-modified polystyrene such as described in European Pat. No. 125,739 and U.S. Pat. No. 4,101,504, and acrylate copolymers and core shell polymers as described in U.S. Pat. No. 4,092,202.

Sufficient quantities of the impact modifying agent is employed to give the desired increase in impact performance of the polyblend. Advantageously, the quantity of impact modifying agent employed is from 0.1 to 10, preferably from 2.0 to 10.0, and more preferably from 3.0 to 8.0 weight percent of the combined weight of the thermoplastic aromatic polycarbonate (a) and thermoplastic polyurethane (b) in the polyblend.

Sufficient quantities of the filler are employed to give a desired increase in modulus and/or a decrease in the coefficient of linear thermal expansion of the polyblend. Advantageously, the quantity of filler employed is from 2.0 to 25.0 and is preferably from 5 to 15 weight percent of the combined weight of the thermoplastic aromatic polycarbonate (a) and thermoplastic polyurethane (b) in the polyblend.

Impact-modifying agents and fillers can be, and advantageously are, used in combination to enhance the physical properties of the polyblend.

The polyblends of the present invention can be melt extruded or molded to form articles such as automotive parts, tool housings, structural components, recreational objects, household appliances and enclosures for transportation or communication and the like. The use of the polyblends of the invention in place of thermoplastic polycarbonate in such applications is particularly advantageous where in the application there is a risk of the prepared article coming into contact with organic solvents, especially hydrocarbon solvents.

ILLUSTRATIVE EMBODIMENTS

The following examples are given to illustrate the invention and should not be interpreted as limiting it in any way. Unless stated otherwise, all parts and percentages are given by weight.

The following materials are used in the examples. All thermoplastic polyurethanes are derived from a methanediphenylisocyanate and a polyol.

THERMOPLASTIC POLYURETHANES (TPU)

TPU-E a thermoplastic polyurethane prepared from a polybutylene adipate ester polyol having Shore Hardness of 90A (ASTM D-2240) and an estimated tensile strength of 6000 psi (ASTM D-412) and a melt flow rate (MFR)( ASTM D-1238-85) 15 g/10 minutes at 224° C./2.16 kg.

TPU-F a thermoplastic polyurethane prepared from a polybutylene adipate ester polyol having Shore Hardness of 55D and an estimated tensile strength of 6500 psi and a MFR 15 g/10 minutes at 224° C./2.16 kg.

TPU-G a thermoplastic polyurethane prepared from a polybutylene adipate ester polyol having Shore Hardness of 65D and an estimated tensile strength of 5900 psi and a MFR 30 g/10 minutes 224° C./5.0 kg.

TPU-H a thermoplastic polyurethane prepared from a polytetramethylene glycol, polyether polyol, having a Shore Hardness of 90A and an estimated tensile strength of 6200 psi and a MFR 17 g/10 minutes at 224° C./2.16 kg.

TPU-J a thermoplastic polyurethane prepared from a polytetramethylene glycol, polyether polyol, having a Shore Hardness of 55D and an estimated tensile strength of 6500 psi and a MFR 11 g/10 minutes at 224° C./2.16 kg.

TPU-K a thermoplastic polyurethane prepared from a polytetramethylene glycol, polyether polyol, having a Shore Hardness of 65D and an estimated tensile strength of 6500 psi and a MFR 20 g/10 minutes at 224° C./5.0 kg

THERMOPLASTIC POLYCARBONATE

PC-1 a commercially available thermoplastic polycarbonate Calibre ® 300-15, sold by The Dow Chemical Company, derived from bisphenol A having a melt flow rate of 15 g/10 minutes at 300° C./1.2 kg weight (ASTM D-1238)

The polyblends of the following examples are prepared in a Werner-Pfleider Twin-Screw extruder ZSK-30 operating at 400 rpm, torque 60–70 percent, die pressure 100 psi, front zone temperature 240° C., rear zone temperature 230° C. Polycarbonate polymer was dried prior to blending for at least 4 hours in a circulating air oven at about 120° C. Similarly, TPU polymer was dried in a dehumidifying dryer at about 99° C. for at least 4 hours.

Molded articles from the polyblends are prepared by injection molding using an Arbury 28 ton injection molder operating at injection pressure 600–800 psi, holding pressure 300–450 psi, nozzle temperature 227°–215° C., all barrel temperature 232°–220° C., mold temperature 49°–38° C. Prior to molding the granular polyblend is dried at 100° C. for 4 hours in a dehumidifying dryer.

The compositions of the polyblends prepared and the properties of the molded articles obtained from the polyblends are as indicated in Table I.

Test results are in accordance with the following test methods. Melt flow rates, ASTM D-1238-85; flexural modulus, ASTM D-790-84; distortion temperature under load (DTUL), ASTM D-648-82; heat sag, ASTM D-3769; notched izod, ASTM D-256-84; and environmental stress crack resistance (ESCR), GMR-3779.

TABLE I

| Example | TPU parts by wt. | PC-1 parts by wt. | MFR① | Flexural Modulus (psi × 10⁵) | DTUL② (°F.) | 10 mm Notched Izod (−20°F.) ft-lb/in | ESCR③ Stress④ (psi) | ESCR③ Strain⑤ (%) |
|---|---|---|---|---|---|---|---|---|
| A* | — | 100 | 15.0⑥ | 3.28 | — | 15.5 | >500 | >0.1 |
| 1 | E-25 | 75 | 7.1 | 2.40 | 264 | 2.1 | 2440 | 1.0 |
| 2 | E-30 | 70 | 8.9 | 2.30 | 262 | 2.9 | 2270 | 1.0 |
| 3 | E-35 | 65 | 11.9 | 1.80 | 253 | 1.6 | 3260 | 2.0 |
| 4 | F-25 | 75 | 7.7 | 2.70 | 264 | 2.4 | 2690 | 1.0 |
| 5 | F-30 | 70 | 10.9 | 2.40 | 262 | 2.9 | 2410 | 1.0 |
| 6 | F-35 | 65 | 17.1 | 2.20 | 253 | 2.4 | 2210 | 1.0 |
| 7 | G-25 | 75 | 8.0 | 2.60 | 261 | 1.9 | 2620 | 1.0 |
| 8 | G-35 | 65 | 21.3 | 2.20 | 259 | 1.6 | 2150 | 1.0 |
| B* | H-30 | 70 | 10.4 | 2.10 | 256 | 3.3 | 2050 | 1.0 |
| C* | J-30 | 70 | 14.4 | 2.10 | 257 | 2.8 | 2090 | 1.0 |
| D* | K-30 | 70 | 11.6 | 2.10 | 252 | 2.5 | 2260 | 1.0 |

*not an example of this invention
① Melt flow rate ASTM D-1238-85, 230° C./3.8 kg
② Distortion temperature under load (66 psi) ASTM D-648
③ Environmental stress crack resistance GMR-3779, 75% isooctane/25% toluene
④ Calculated from failure strain and modulus
⑤ Minimum at failure
⑥ Melt flow rate ASTM D-1238-85, 300° C./1.2 kg As can be seen from the data presented in Table I, the melt flow rate properties of the polyblends improve with the increasing quantity of thermoplastic polyurethane incorporated therein.

With respect to flexural modulus it is to be observed that as more TPU is incorporated into the blend the resulting blend exhibits more flexibility as seen by a lower flexural modulus. When the blended thermoplastic polyurethane is a hard polyurethane, then the increase in flexibility of the resulting blend is somewhat lower than when a similar percentage of a soft thermoplastic polyurethane is present in the polyblend.

The flexural modulus of the resulting polyblend will also be dependent on the post-injection, extruding, and mold thermal history to which the polyblend has been subjected. If the polyblend is allowed to cool slowly, hard segments contained within the thermoplastic polyurethane can more easily align into crystalline formations influencing the flexural modulus of the final product. If the polyblend is cooled quickly, there is insufficient time to obtain crystalline formations. The presence of crystalline formation can enhance the flexural modulus.

Distortion temperatures under load become relatively lower as the quantity of TPU in the polyblend increases.

Polyblends containing polyester polyol-based TPUs show an optimum notched izod impact performance when they contain about 30 percent by weight of the thermoplastic polyurethane. Surprisingly, this optimum performance is associated with the softer polyester polyol-based TPUs.

Again, as with the impact strength properties, optimum ESCR performance is observed when using the softer thermoplastic polyurethanes. The data suggests that optimum solvent resistance is obtained when the thermoplastic polyurethane is present in about 25 percent by weight of the polyblend.

Comparative Examples B, C and D are polyblends based on polyether polyol-based TPUs. As can be seen from the table, the polyblends of this invention offer better modulus, DTUL and ESCR performance.

What is claimed is:

1. A thermoplastic polyblend which consists essentially of
   (a) from 65 to 95 percent by weight based on the combined weights of (a) and (b) of a thermoplastic aromatic polycarbonate polymer; and
   (b) from 5 to 35 percent by weight based on the combined weights of (a) and (b) of one or more polyester polyol-based thermoplastic polyurethanes having a Shore Hardness of from 70A to 70D, and characterized in that the resulting thermoplastic polyblend exhibits an environmental stress crack resistance of from 2150 psi and a flexural modulus of from $2.20 \times 10^5$ psi.

2. The polyblend of claim 1 wherein the polycarbonate has a melt-flow of at least 8 g/10 minutes at 300° C./1.2 kg.

3. The polyblend of claim 2 wherein the polyester polyol-based thermoplastic is present in from 15 to 35 percent by weight based on the combined weight of (a) and (b).

4. The polyblend of claim 3 wherein the polyester polyol-based thermoplastic is present in from 25 to 35 percent by weight based on the combined weights of (a) and (b).

5. The polyblend of claim 2 wherein the thermoplastic polyurethane has a Shore Hardness of from 70A to 100A.

6. The polyblend of claim 5 wherein the thermoplastic polyurethane has a Shore Hardness of from 85A to 100A.

7. The polyblend of claim 2 wherein the thermoplastc polyurethane has a Shore Hardness of from 40D to 70D.

8. The polyblend of claim 2 additionally consisting essentially of an impact modifying agent or a filler.

9. The polyblend of claim 8 wherein the impact modifying agent is present in from 0.1 to 10.0 percent by weight of the combined weight (a) and (b).

10. The polyblend of claim 8 wherein the filler is present in from 2.0 to 25.0 percent by weight of the combined weights of (a) and (b).

11. The polyblend of claim 2 which consists essentially of
    (a) from 65 to 75 percent by weight based on the combined weights of (a) and (b) of a thermoplastic aromatic polycarbonate which has a melt-flow of at least 10 g/10 minutes at 300° C./1.2 kg; and
    (b) from 25 to 35 percent by weight of the combined weight (a) and (b) of a polyester polyol-based thermoplastic polyurethane which has a Shore Hardness from 85A to 100A.

12. The polyblend of claim 2 which consists essentially of
    (a) from 65 to 75 percent by weight based on the combined weights of (a) and (b) of a thermoplastic aromatic polycarbonate which has a melt-flow of at least 10 g/10 minutes at 300° C./1.2 kg; and
    (b) from 25 to 35 percent by weight of the combined weight (a) and (b) of a polyester polyol-based thermoplastic polyurethane which has a Shore Hardness from 40D to 65D.

13. An article prepared by melt extrusion or molding of a polyblend characterized in that the polyblend consists essentially of
    (a) from 65 to 95 percent by weight based on the combined weights of (a) and (b) of a thermoplastic aromatic polycarbonate polymer; and
    (b) from 5 to 35 percent by weight based on the combined weights of (a) and (b) of one or more thermoplastics having a Shore Hardness from 70A to 70D, and characterized in that the thermoplastic polyurethane is a polyester polyol-based thermoplastic polyurethane.

* * * * *